United States Patent [19]

Kang

[11] Patent Number: 5,739,656
[45] Date of Patent: Apr. 14, 1998

[54] NUMERICAL CONTROLLING METHOD WITH MIRROR IMAGE FUNCTION

[75] Inventor: Moon Kang, Suwon, Rep. of Korea

[73] Assignee: Samsung Electronics Co., Ltd., Kyungki-do, Rep. of Korea

[21] Appl. No.: 600,605

[22] Filed: Feb. 13, 1996

[30] Foreign Application Priority Data

Feb. 13, 1995 [KR] Rep. of Korea ............ 95-2594

[51] Int. Cl.[6] ............................................. G05B 19/25
[52] U.S. Cl. ............ 318/573; 364/474.31; 364/474.28; 395/87; 395/111; 318/568.15
[58] Field of Search ................ 318/573, 568.15, 318/568.11, 569; 364/474.25, 474.34, 474.28, 474.31, 474.23; 395/87, 111

[56] References Cited

U.S. PATENT DOCUMENTS

| | | | |
|---|---|---|---|
| 4,031,639 | 6/1977 | Heaman et al. | 318/573 |
| 4,409,650 | 10/1983 | Noguchi | 318/573 |
| 4,591,968 | 5/1986 | Nozawa et al. | 364/474.23 |
| 4,734,864 | 3/1988 | Kawamura et al. | 364/474.23 |

Primary Examiner—John W. Cabeca
Attorney, Agent, or Firm—Burns, Doane, Swecker & Mathis, LLP

[57] ABSTRACT

A numerical control method includes the steps of (a) reading an instruction block from a numerical control program; (b) if a predetermined mirror image code is in the instruction block, determining the coordinates of a target location according to the code; (c) adding predetermined interpolation data to the target location coordinates; and (d) moving a tool to the target location to produce the same cutting direction as an original cutting. Thus, uniform machining precision can always be obtained.

1 Claim, 3 Drawing Sheets

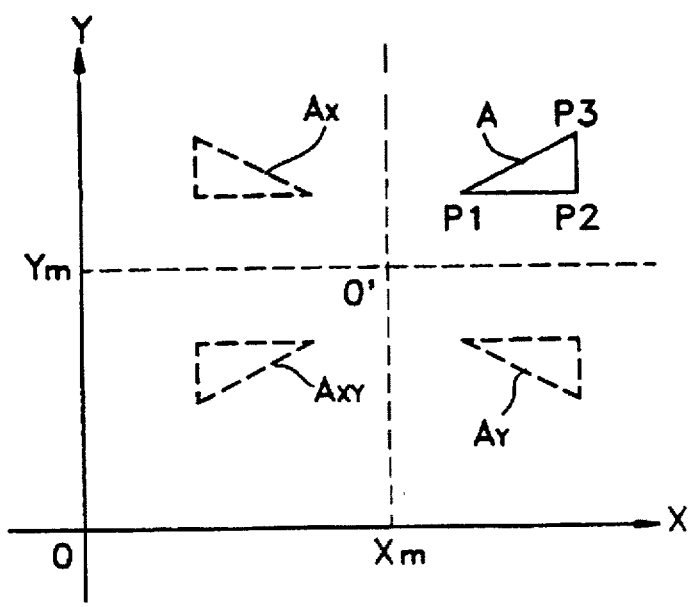
FIG._1
*(PRIOR ART)*
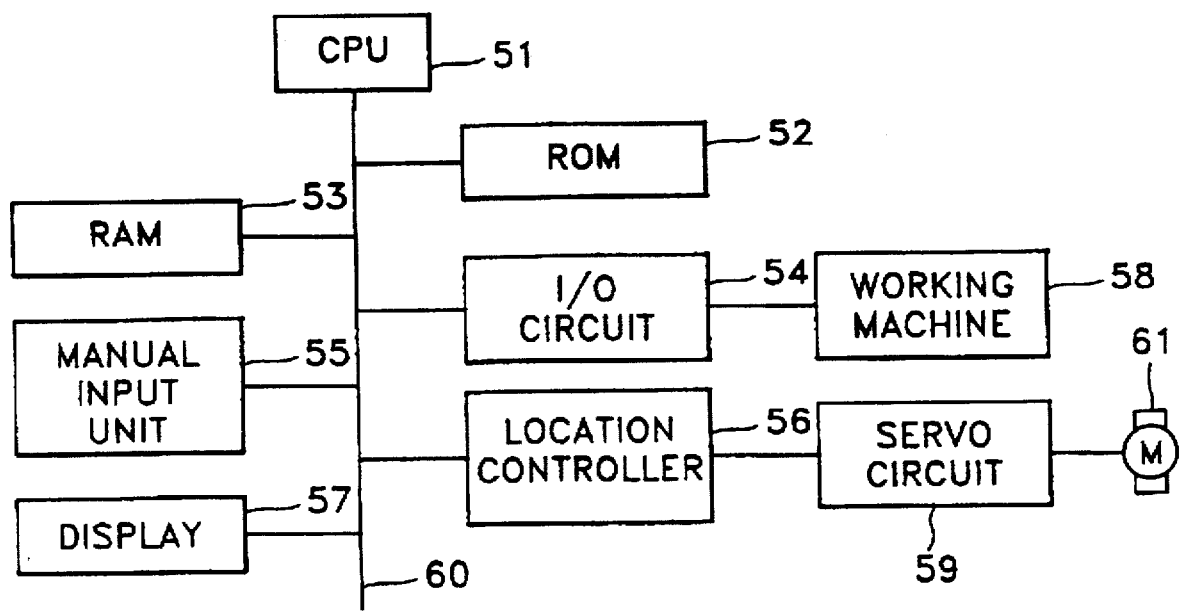
FIG._2

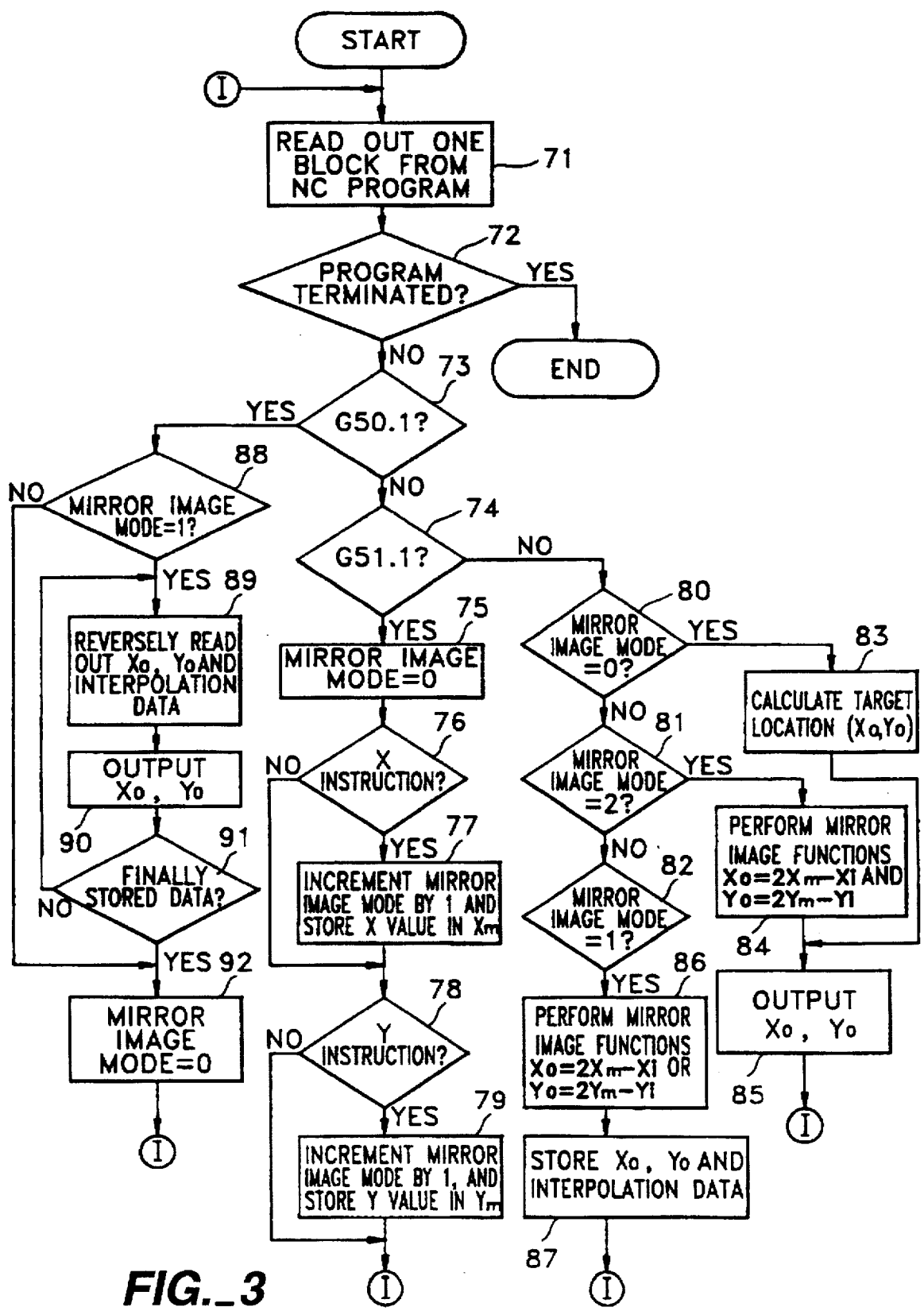
FIG._3

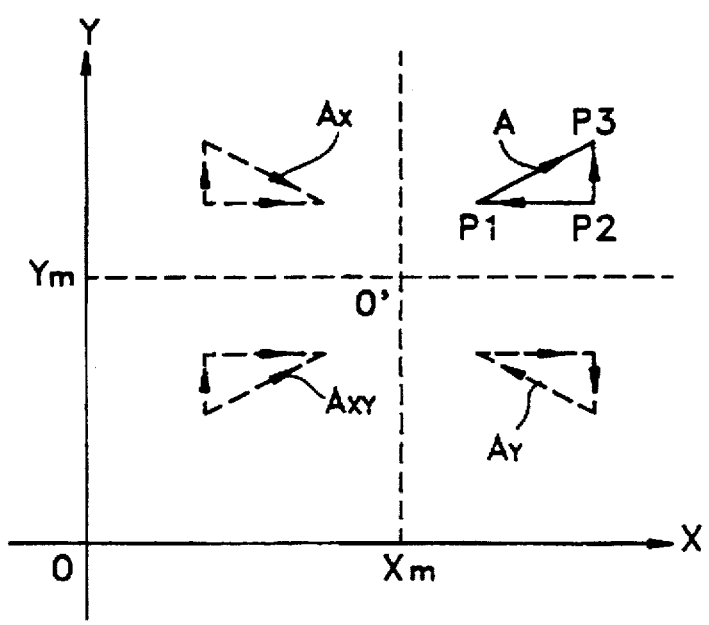
FIG._4

NUMERICAL CONTROLLING METHOD WITH MIRROR IMAGE FUNCTION

BACKGROUND OF THE INVENTION

The present invention relates to a numerical controlling method for a machine tool, and more particularly, to a numerical controlling method with a mirror image function, in which uniform machining precision is obtained by enabling a machine tool for the mirror-image machining of a workpiece to maintain the same cutting direction as that with respect to the original shape.

A numerical controlling device used in a machine tool generally has a mirror image function for inverting a tool shift instruction code from a numerical controlling program.

FIG. 1 is a view for explaining the mirror image function of such a conventional numerical controlling device.

As shown in FIG. 1, a workpiece having a shape A defined by three vertices P1, P2 and P3 can be cut along four machining paths. That is, taking point 0' as a reference, the workpiece can be cut in the original shape A shown in the first quadrant, or in one of mirror images $A_X$, $A_Y$ and $A_{XY}$ shown in the second, third and fourth quadrants, respectively. Here, Xm and Ym indicate mirror image axes with respect to the X-axis and Y-axis, respectively.

When a mirror image is formed with respect to both the X- and Y-axes in the conventional numerical controlling device having such a mirror image function, the cutting direction of the mirror image as shown in the third quadrant of FIG. 1 is the same as the cutting direction shown in the first quadrant, according to the original shape. Therefore, if the original cutting direction is, for example, stably downward, a workpiece is cut in the same downward direction by using mirror image $A_{XY}$. On the other hand, when a mirror image is formed with respect to the X-axis or the Y-axis only, the cutting direction is reversed as shown in the third and fourth quadrants. Such upward cutting produces poor machining results. This problem is also observed in the numerical controlling device having a programmable mirror image function, disclosed in U.S. Pat. No. 4,734,864, which is a related prior art.

SUMMARY OF THE INVENTION

To overcome the above problem, the object of the present invention is to provide a numerical controlling method with a mirror image function, which is capable of obtaining uniform machining precision by enabling a workpiece to be cut in the same cutting direction as that with respect to form the original shape (i.e., prior to mirror imaging), regardless of the mirror axis.

To achieve the above object, there is provided a numerical controlling method for controlling a mirror image, for use in a machine tool, comprising the steps of: (a) reading an instruction block from a numerical controlling program; (b) determining whether a predetermined mirror image code is in said read instruction block; (c) when said mirror image code is found in said step (b), determining the coordinates of a target location according to said mirror image code; (d) adding predetermined interpolation data to the coordinates of said target location determined in said step (c) to produce the same cutting direction as an original cutting direction; (e) moving a tool according to said coordinates of said target location interpolated in said step (d); and (f) moving said tool in said original cutting direction as instructed in said numerical controlling program, when no image mirror code is found in said step (b).

BRIEF DESCRIPTION OF THE INVENTION

The above object and advantages of the present invention will become more apparent by describing in detail a preferred embodiment thereof with reference to the attached drawings in which:

FIG. 1 is a view for explaining a mirror image function in a conventional numerical controlling device;

FIG. 2 is a schematic block diagram of a numerical controlling device, for explaining a numerical controlling method with a mirror image function according to the present invention;

FIG. 3 is a flow-chart for explaining the numerical controlling method by the numerical controlling device of FIG. 2; and FIG. 4 is a view for explaining a mirror image function in the numerical controlling method according to the present invention.

DETAILED DESCRIPTION OF THE INVENTION

Referring to FIG. 2, a numerical controlling device employing a numerical controlling method with a mirror image function according to the present invention is comprised of a central process unit (CPU) 51 for controlling the entire system, a ROM 52 as a main memory for storing an overall control program of the system, a RAM 53 as an auxiliary memory for temporarily storing data needed for an operation and control and the processed results thereof, an input and output (I/O) circuit 54 for interfacing with a machine tool 58, a manual input unit 55 for directly inputting data or a signal by an operator, a location controller 56 for controlling a servo motor 61 of machine tool 58 via a servo circuit 59 for driving servo motor 61, and a display 57 for displaying data and processed results of the whole system. Here, though a computer monitor is used as display 57, other displays can be available so long as they interface with the computer system. Reference numeral 60 denotes a system bus for interconnecting all of the device elements.

The numerical controlling method of the present invention will be described in connection with the numerical controlling device as constituted above.

In the numerical controlling method of the present invention, a mirror image axis for performing a mirror image function is set by an instruction "G51.1 X Y," where G51.1 indicates a mirror image instruction code and X and Y indicate the mirror image axes (with coordinates in the blanks).

For instance, assuming that the executed instruction is "G51.1X100," the X-coordinate of a mirror image axis is 100. Similarly, for an instruction of "G51.1 Y100" or "G51.1 X100 Y100," the Y-coordinate of a mirror image axis is 100 or the X- and Y-coordinates of the mirror image axes are both 100, respectively.

Meanwhile, a mirror image function is canceled by an instruction G50.1, after which the tool path of a movement instruction coincides with an original tool path, that is, the original cutting direction.

This will be described in more detail with reference to the flow-chart of FIG. 3 which shows the numerical controlling method by the numerical controlling device of FIG. 2. Here, the various modes of the mirror image operation can be summarized by the following table.

| MODE SETTING (#) | MIRROR IMAGE OPERATION |
| --- | --- |
| mode 0 | no mirror image function |
| mode 1 | X-axis or Y-axis only |
| mode 2 | both X-axis and Y-axis |

Referring to FIGS. 2 and 3, CPU 51 reads out an instruction block from a numerical controlling program, in step 71. In step 72, it is determined whether the last read instruction is for terminating the program and if so, i.e., the answer is YES, the program stops. If the answer is NO in step 72, CPU 51 determines whether the instruction is a mirror image cancel instruction code G50.1, in step 73. If such a code is not found in step 73, CPU 51 determines in step 74 whether the instruction is a mirror image instruction code G51.1, and if so, the mirror image mode is set to "0" in step 75. (The mirror image mode determines the performance of an image mirror function based on the above table.) Thus, in mirror image mode 0, should an instruction for an X-axis coordinate be issued in step 76, the mirror image mode is incremented by 1 and, in step 77, the X-axis coordinate is stored in Xm (the mirror image axis with respect to the X-axis); and should an instruction for a Y-axis coordinate be issued in step 78, the mirror image mode is incremented by 1 and, in step 79, the Y-axis coordinate is stored in a mirror image axis Ym (the mirror image axis with respect to the Y-axis). Here, the mode increment steps 77 and 78 are bypassed without an X coordinate or Y coordinate being seen in step 76 or 77. Thereafter, the next instruction is read out and the above procedure is repeated.

Meanwhile, if a mirror image instruction code G51.1 is not found (i.e., the answer is NO in step 74), the program advances to step 80. Here, assuming the mirror image mode is not mode 0 but mode 2 in step 81, such that the mirror image function is performed with respect to both axes, a target location $(X_o, Y_o)$ is calculated in step 84 according to both the following equations:

$$X_o = 2Xm - Xi$$

$$Y_o = 2Ym - Yi$$

where Xi and Yi are displacement coordinate values with respect to the X- and Y-axes, respectively, as instructed in the numerical controlling program. Then, the coordinate values $X_O$ and $Y_O$ of the calculated target location are output in step 85.

If, however, the mirror image mode is mode 0 in step 80, which indicates that the mirror image function is not performed, the instructed cutting direction coincides with an original cutting direction, in step 83.

When the mirror image mode is determined as being mode 1 in step 82, mirror-imaging is to be performed with respect to only one axis, and the mirror image function is performed for the single axis (X or Y) in step 86. That is, if Xm≠0, the workpiece is cut in the X-axis mirror image $(X_O=2Xm-Xi)$ and if Ym≠0, the workpiece is cut according to the Y-axis mirror image $(Y^O=2Ym-Yi)$.

To obtain the same cutting direction as used to form the original shape, the thus-obtained target locations $X_O$ and $Y_O$ are stored together with predetermined interpolation data, in step 87. Steps 86 and 87 are performed until mirror image cancel instruction G50.1 is issued.

On the other hand, if a mirror image cancel code G50.1 is found in step 73, it is determined in step 88 whether the mirror image mode is mode 1, and if so, indicating that a mirror image is being formed with respect to just one axis, the stored data is read out in the reverse order with respect to its storing, to output $X_O$ and $Y_O$ (steps 89 and 90). This procedure is performed until stored data is incorporated in step 91. If the mirror image mode is not mode 1 in step 88, which indicates that a mirror image is formed with respect to both the X- and Y-axes, the mirror image mode is set as mode 0.

FIG. 4 is a view for explaining the mirror image function according to the numerical controlling method of the present invention. Here, it should be noted that the cutting direction is the same in all quadrants. In FIG. 4, like reference codes denote the same elements as in FIG. 1.

As described above, a mirror image formed with respect to both axes is treated in the conventional manner, and a mirror image formed with respect to just one axis is given the same cutting direction as that with respect to form the original shape by setting the tool path as opposite that of the instruction.

As for a movement instruction of the Z-axis, such movement is rapidly made until before cutting, in general, and a linear interpolation is performed at a cutting time point. Accordingly, when the movement of a tool is made in the order reverse to the instruction path according to the present invention, the movement along the Z-axis should be varied. For example, when the movement is downward along the Z-axis, linear interpolation is performed, and when the movement is upward along the Z-axis, a rapid movement is performed.

As described above, according to the numerical controlling method for controlling a mirror image, the same cutting direction as that with respect to form the original shape is given to a mirror image formed with respect to a single axis as well as both axes. Thus, uniform machining precision can always be obtained—even for a single-axis mirror image.

What is claimed is:

1. A numerical controlling method for controlling a mirror image, for use in a machine tool, comprising the steps of:

(a) reading an instruction block from a numerical controlling program;

(b) determining whether a predetermined mirror image code is in said read instruction block;

(c) when said mirror image code is found in said step (b), determining the coordinates of a target location according to said mirror image code;

(d) adding predetermined interpolation data to the coordinates of said target location determined in said step (c) to produce the same cutting direction as an original cutting direction;

(e) moving a tool according to said coordinates of said target location interpolated in said step (d); and (f) moving said tool in said original cutting direction as instructed in said numerical controlling program, when no image mirror code is found in said step (b) .

* * * * *